United States Patent [19]

Di Renzo et al.

[11] Patent Number: 5,165,906

[45] Date of Patent: Nov. 24, 1992

[54] ZEOLITE FROM THE CLASS OF MAZZITE, PROCESS FOR ITS SYNTHESIS, AN ITS USE AS A CATALYST

[75] Inventors: Francesco S. Di Renzo, Montpellier; François Fajula, Teyran; Francois Figuéras, Montpellier; Thierry des Courieres, Lyons, all of France

[73] Assignee: Societe Nationale Elf Aquitaine, Courbevoie, France

[21] Appl. No.: 574,275

[22] Filed: Aug. 28, 1990

[30] Foreign Application Priority Data

Aug. 30, 1989 [FR] France ................................ 89 11383

[51] Int. Cl.$^5$ ............................................. C01B 33/34
[52] U.S. Cl. ..................................... 123/710; 423/718
[58] Field of Search ............... 423/328, 329, 118, 330; 502/64

[56] References Cited

U.S. PATENT DOCUMENTS

| | | | |
|---|---|---|---|
| 3,578,723 | 5/1971 | Bowes et al. | 423/328 |
| 3,642,434 | 2/1972 | Dwyer | 423/329 |
| 4,021,447 | 5/1977 | Rubin et al. | 423/328 |
| 4,241,036 | 12/1980 | Flanigan et al. | 423/329 |
| 4,377,502 | 3/1983 | Klotz | 423/328 |
| 4,892,721 | 1/1990 | Leonowicz et al. | 423/328 |
| 4,957,719 | 9/1990 | Taga et al. | 423/328 |
| 5,000,932 | 3/1991 | Vaughan | 423/328 |

*Primary Examiner*—R. Bruce Breneman
*Attorney, Agent, or Firm*—Burgess, Ryan and Wayne

[57] ABSTRACT

This invention relates to a new zeolite from the class of mazzite, containing a fraction of non-exchangeable potassium cations, and also to a process for its synthesis. The crystallinity and the adsorption capacity of the protonated form of this zeolite are maintained after a prolonged hydrothermal treatment.

16 Claims, No Drawings

ZEOLITE FROM THE CLASS OF MAZZITE, PROCESS FOR ITS SYNTHESIS, AN ITS USE AS A CATALYST

FIELD OF THE INVENTION

This invention relates to a synthetic crystalline zeolite of the mazzite type, a process for its synthesis and its use in adsorption and as a catalyst for the conversion of hydrocarbons.

BACKGROUND OF THE INVENTION

The zeolite known under the name mazzite was discovered in 1972 (GALLI et al. Contr. Mineral. and Petrol 45 99 (1974)) in the basalts of Mount Semiol, Loire, France. The structure of the mazzite (Rinaldi et al. Acta Cryst. B31 1603 (1975)) is described by an assembly of six columns of gmelinite cages, which corresponds to two hexagonal faces, 9 square faces and three octogonal faces joined together with a displacement of ±1/4.

The three-dimensional lattice is characterized by a system of three channels which are parallel to the crystallographic axis $\bar{c}$:

a—quasi-cylindrical channels bordered by 12-tetrahedral rings whose free diameter is between 0.75 and 0.8 nm. The walls of these channels are lined with ladders consisting of alternating rings made up of 4 tetrahedrons of gmelinite cages and of rings made up of 5 tetrahedrons, which are the result of joining the columns;

b—secondary channels, located between the columns of gmelinite cages and consisting of rings made up of 8 tetrahedrons forming a highly distorted chair conformation, and c—channels inside the columns made up of cages, accessible via the rings consisting of 6 tetrahedrons.

The zeolites of the mazzite type are characterized by a unique X-ray diffraction pattern.

The best-known and best-characterized examples of this type of zeolite are the zeolites omega and ZSM-4. They are solids which are of interest for adsorption and catalysis.

The synthesis of the zeolite omega is described in U.S. Pat. Nos. 4,241,036 (UNION CARBIDE) and 4,091,007 (MOBIL OIL). French Patent 2,074,007 (MOBIL OIL) and British Patent 1,297,256 (MOBIL OIL) describe the synthesis of ZSM-4. A solid which is isostructural with zeolite omega and called LZ 202 is described in Patent Application PCT WO 87/00,158 (UNION CARBIDE).

The synthesis of the zeolites omega and ZSM-4 is likewise described in the scientific literature by Aiello et al. (J. Chem Soc. A 1970 1470), Dwyer et al. (J. Catal 59 263 (1979)), Cole et al. (Adv. Chem. Ser. 121 583 (1973)), Perrotta et al. (J. Catal. 55 240 (1978)), Araya et al. (Zeolites 4 263 (1984)), Fajula et al. (Zeolites 7 203 (1987)) and Nicolas et al. (Stud. Surf. Sci. Catal. 37 115 (1987)).

Zeolite omega and zeolite ZSM-4 are prepared by hydrothermal crystallization of reactive alkaline gels of aluminosilicates. With the exception of the one described in Patent Application WO 87/00,158, all syntheses are carried out in the presence of an organic reagent, such as tetramethylammonium (TMA), pyrrolidine, choline, diazobicyclooctane or triethylenediamine. TMA is the most common and most selective organic reagent. These organic compounds are used as such or in the form of hydroxide or in salt form. The addition of inorganic bases is necessary to obtain the required level of alkalinity. For the synthesis of zeolite omega and zeolite ZSM-4, the inorganic base used is sodium hydroxide. The reaction medium can contain lithium but does not tolerate potassium or tolerates only a small amount of it (Aiello et al. J. Chem. Soc. A 1970 1470 and Cole et al. Adv. Chem. Ser. 121 583 (1973)). In the presence of potassium, offretite is in general obtained.

The general formula of the synthetic zeolites of the mazzite type in their form as synthesized can be written in terms of moles of oxides:

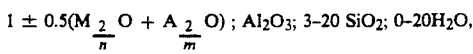

$$1 \pm 0.5(M_{\frac{2}{n}}O + A_{\frac{2}{m}}O); Al_2O_3; 3\text{-}20\ SiO_2; 0\text{-}20H_2O,$$

where M is an n-valent cation, in general sodium, and A is an organic reagent carrying m positive charges.

According to a particular feature of the aluminosilicate, such as the zeolites, the cations and the organic compounds incorporated in the course of the synthesis can be removed and replaced by other cations. These operations are even necessary for freeing the pores of the zeolite and generate catalytic activity.

The organic reagents are more conventionally removed by oxidative calcination. The cations M are exchangeable for other cations in aqueous medium by well-known methods. The most useful cations for catalysis are the proton or cations belonging to the class of rare earths.

However, these exchange treatments induce an embrittlement of the zeolitic skeleton, especially during the operations which require the application of elevated temperatures in the presence of water vapour. The phenomenon of embrittlement is well known; it is caused by reactions which hydrolyze the Al-O-T bonds, where T is a cation of the lattice, in general silicon, the reactions being catalysed by the protons which are present in the lattice to neutralize the excess negative charge associated with the presence of aluminium. In the course of prolonged hydrothermal treatments, the zeolite structure gradually decomposes and finally becomes amorphous.

SUMMARY OF THE INVENTION

The main object of this invention is a synthetic crystalline zeolite of the mazzite type which retains its crystallinity and its characteristic catalytic properties and adsorption behaviour after a prolonged hydrothermal treatment.

The second objective is a crystalline zeolite of the mazzite type in which a portion of the inorganic cations which were incorporated during the synthesis is non-exchangeable.

Accordingly, the invention relates to a new synthetic crystalline zeolite of the mazzite type whose stoichiometric composition, expressed in moles of oxides, corresponds to

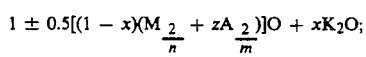

$$1 \pm 0.5[(1-x)(M_{\frac{2}{n}} + zA_{\frac{2}{m}})]O + xK_2O;$$

$$Al_2O_3,\ ySiO_2;\ 0\text{-}20H_2O$$

where M represents at least one exchangeable n-valent alkali metal or alkaline earth metal cation, preferably sodium or potassium, or a proton, A is an organic reagent carrying m positive charges; preferably the tetramethylammonium ion, x is the fraction of non-exchangeable potassium cations, which is between 0.1 and 0.8, preferably between 0.2 and 0.5, y is in the range from 3 to 20, preferably from 4 to 10, and z is equal to one or zero, the X-ray diffraction pattern corresponds to that described in Table 1

Crystallinity and adsorption capacity in its protonated form are retained after a prolonged hydrothermal treatment.

We have named this new zeolite of the mazzite type MZ 34.

DETAILED DESCRIPTION OF THE INVENTION

The main peaks of the X-ray diffraction pattern of MZ 34 are listed in Table 1.

TABLE 1

| X-ray diffraction pattern of the zeolite MZ-34 | | |
|---|---|---|
| $d(10^{-1}$ nm) | $I/I_o \times 100$ | hkl |
| 15.47 | 9 | 100 |
| 9.03 | 60 | 110 |
| 7.83 | 15 | 200 |
| 6.82 | 15 | 101 |
| 5.93 | 31 | 210 |
| 5.47 | 3 | 201 |
| 5.24 | 6 | 300 |
| 4.679 | 34 | 211 |
| 4.357 | 5 | 310 + 301 |
| 3.934 | 11 | 400 |
| 3.789 | 100 | 311 + 002 |
| 3.691 | 27 | 102 |
| 3.610 | 35 | 320 |
| 3.501 | 67 | 112 + 401 |
| 3.42 | 13 | 202 + 410 |
| 3.264 | 6 | 321 |
| 3.149 | 85 | 500 + 411 |
| 3.076 | 36 | 302 |
| 3.030 | 32 | 330 |
| 2.975 | 22 | 420 |
| 2.910 | 78 | 501 + 222 |
| 2.826 | 6 | 510 + 331 |
| 2.619 | 18 | 511 |

The diffraction pattern was obtained by the conventional method, using copper $K\alpha_1$ radiation and an amplifying detector. The intensities of the peaks are recorded as a function of their position and expressed as 2 theta, where theta is the Bragg angle. On this basis, the relative intensities $I/Io$, where I is the intensity of a given peak and Io is the intensity of the most important peak, and the interplanar spacings $d(10^{-1}$ nm) are determined. These values can slightly vary as a function of parameters such as the degree of hydration of the zeolite, the temperature or the type of apparatus used, but, as a general rule, the X-ray diffraction pattern is characteristic of the crystalline lattice of the zeolite.

In the zeolites of the omega or ZSM-4 type, the inorganic and organic cations introduced in the course of the syntheses can be removed by a combination of oxidative thermal treatments and exchange reactions by methods well known in the art. They are described, for example, in the publications of Perrotta et al. (J. Catal.55 240 (1978)), of Cole et al. (Adv. Chem. Ser. 121 583 (1973)) or Weeks et al. (J. Chem. Soc. Faraday Trans. I 72 575 (1976)).

In contrast, MZ-34 contains x potassium ions per aluminium, which cannot be exchanged by these methods.

Thus, after M-34 has been converted to its protonated form, it still retains x potassium ions. Its potassium content does not decrease as a result of the hydrothermal treatments.

The protonated form of MZ-34 is obtained by thermal decomposition of the organic cation, exchange with an inorganic ammonium salt, followed by thermal decomposition of the ammonium salt.

In general, ammonium nitrate is used as inorganic ammonium salt. The exchange requires a treatment under reflux of about 18 hours.

The thermal decomposition of the organic cation and the ammonium salt takes place by calcination at temperatures of 500°-600° C. in air over a period of about 5 hours.

The stoichiometric composition of the protonated form of MZ-34, expressed in moles of oxides, is $$1 \pm 0.5 \, [(1-x)H + x \, K]_2O; \, Al_2O_3; \, ySiO_2; \, 0 - 20H_2O$$

where x and y have the abovementioned meanings.

Table 2 shows that after a treatment at 750° C. for 17 hours in the presence of water vapour, the potassium level of MZ-34 remains unchanged, while the initially low potassium level of zeolite omega drops after the hydrothermal treatment of the acid form.

The remaining cation level is determined by chemical elemental analysis.

After potassium ions have been introduced into a zeolite omega or a zeolite ZSM-4, they can subsequently be exchanged with a cation of any salt. Thus, a zeolite omega exchanged with 2% by weight of potassium and treated under reflux with a molar solution of ammonium nitrate, retains only 0.1% by weight of potassium after this exchange.

The potassium content of a zeolite MZ-34 containing 2% of potassium remains unchanged after such a treatment.

This difference can be explained by the position of potassium in the crystal lattices of zeolite omega and zeolite MZ-34. This position can be deduced from the adsorption capacity of the two zeolites.

TABLE 2

| Properties of the acid forms of zeolite omega and zeolite MZ-34 | | | | |
|---|---|---|---|---|
| | OMEGA | | M-34 | |
| | Starting material | 17 h, 750° C. $1.013 \times 10^5$ Pa H$_2$O | Starting material | 17 h, 750° C. $1.013 \times 10^5$ Pa H$_2$O |
| Crystallinity | 100 | 0 | 100 | 75 |
| Cyclohexane adsorbed (ml×g$^{-1}$) | 0.08 | <0.005 | 0.08 | 0.06 |
| Cracking rate of iso-octane (1) mmol/h/g | 750 | <10 | 700 | 650 |
| % by weight K | 0.1 | <0.03 | 2 | 2 |

(1) 380° C., sv = 11 h$^{-1}$, 1.013 × 10$^5$ Pa

The non-exchangeable potassium ions of MZ-34 do not diminish its adsorption capacity in any way. MZ-34 in its protonated form containing 2% by weight of potassium adsorbs 80% by weight of cyclohexane, 10 to 13% by weight of water at 25° C. and 1333.2 Pa and 3 to 6% of 1,3,5-trimethylbenzene at 25° C. and a pressure of 2666.4 Pa. These results prove that the free pore diameter is at least 0.75 nm and corresponds to the calculated void volume of the large channel (Breck and Grose Adv. Chem. Ser. 121 319 (1973)).

In contrast, in a zeolite omega into which 2% by weight of potassium is introduced by ionic exchange under the same measurement conditions a reduction in its adsorption capacity can be observed. Thus, the adsorption capacity for cyclohexane goes from 8% by weight to 2 to 4%.

By virtue of its porous structure, only the large channel of the zeolite is accessible to hydrocarbons (Chauvin et al. J. Catal. 111 94 (1988)). The exchange process, involving potassium of the zeolite omega, reduces the adsorption capacity, suggesting that the ions introduced are located in the large channel.

On the other hand, in MZ-34, the entire volume of the large channel is unoccupied. Without wishing to be limited by theoretical considerations, we believe that the non-exchangeable potassium ions of MZ-34 are located inside the gmelinite cages of the structure, from where they would not be able to leave because of their size. It should be kept in mind that the ionic radius of anhydrous potassium is 0.133 nm, compared with 0.097 nm for sodium. Furthermore, these gmelinite cages are inaccessible by conventional methods of cationic exchange.

We do not wish to be limited by this explanation, but we believe that the hydrothermal stability of MZ-34 is due to the presence of the non-exchangeable potassium ions. Indeed, the formation of an amorphous structure of zeolite omega or zeolite ZSM-4 as a result of the hydrothermal treatments is caused by reactions, hydrolyzing the Al-O-Si bonds, which are promoted by the presence of protons neutralizing the negative charge. In MZ-34, the non-exchangeable potassium ions block this hydrolytic process and thus stabilize the three-dimensional lattice.

The introduction of potassium ions into a zeolite omega or zeolite ZSM-4 by exchange does not produce a stabilizing effect. These potassium ions are removed in the course of the hydrothermal treatment.

In Table 2, the hydrothermal stability of a zeolite omega and a zeolite MZ-34 in their protonated form are compared.

The protonated forms are obtained from the form as synthesized by calcination at 500° C. in air, exchange under reflux for 18 hours with a molar solution of ammonium nitrate, followed by a second calcination.

The protonated forms are subjected to a hydrothermal treatment, which consists in heating at 750° C. for 17 hours under a water vapour pressure of $1.013 \times 10^5$ Pa.

Under these conditions, MZ-34 retains 75% of its crystallinity, while zeolite omega becomes amorphous. The crystallinity is measured by X-ray diffraction, comparing the ratio between the sums of the areas of the diffraction peaks of the zeolites before and after the hydrothermal treatment.

Another evidence for retention of crystallinity in MZ-34 is its adsorption capacity for cyclohexane, which remains at a value equal to at least 75% of its initial value.

Zeolite omega and zeolite MZ-34 have a comparable activity in the cracking reaction of isooctane at 380° C. and at atmospheric pressure. However, the main advantage of MZ-34 is its activity after the hydrothermal treatment, which is about 80% of the original value, while zeolite omega becomes completely inactive.

This invention likewise relates to the synthesis of MZ-34.

The synthetic procedure comprises the following steps:

a) preparation of an alkaline solution in general containing sodium hydroxide, potassium hydroxide and an organic reagent b) addition of the source of silicon to the clear solution with constant and vigorous stirring, and continued stirring in general for 5 to 100 hours until a liquid and homogeneous mixture is obtained. This operation is generally carried out at ambient temperature, but the dissolution of the source of silicon can be accelerated by keeping the entire batch at a temperature between 30° and 50° C.

c) allowing the alkaline suspension of this source of silicon to stand d) addition of the source of aluminium with vigorous stirring, then rapidly bringing the mixture to the crystallization temperature, which in general is between 80° and 150° C. This temperature is maintained until the formation of a crystalline phase showing the X-ray diffraction pattern given in Table 1. The crystallization time generally varies between 20 and 150 hours.

The molar ratios in the crystallization gel are summarized in Table 3.

TABLE 3

| Molar ratios in the crystallization gel for the formation of zeolite MZ-34 | | | |
|---|---|---|---|
| | Broad range | Preferred range | Particularly preferred range |
| $SiO_2/Al_2O_3$ | 10–100 | 20–80 | 28–60 |
| $H_2O/Al_2O_3$ | 100–1000 | 500–2000 | 600–1300 |
| $OH^-/SiO_2$ | 0.2–1 | 0.5–0.9 | 0.65–0.85 |
| Na/T.C. | 0.4–0.9 | 0.4–0.9 | 0.4–0.9 |
| K/T.C. | 0.10–0.50 | 0.10–0.50 | 0.10–0.50 |
| TMA/T.C. | 0.02–0.2 | 0.02–0.2 | 0.05–0.15 |

T.C.: Na + K + TMA

It is of interest to note that, although the literature teaches that the zeolites of the omega and ZSM-4 type cannot be obtained in the presence of potassium ion proportions greater than about 10%, relative to the total amount of cations (Aiello et al. J. Chem. Soc. A 1970 1470 and Cole et al. Adv. Chem. Ser. 121 583 (1973)), we have found a method which makes it possible to synthesize a zeolite of the mazzite type in media where the potassium ions can represent up to 50% of the inorganic ions.

On the other hand, and we do not wish to be limited by this explanation, we believe that the formation of MZ-34 is in part due to the fact that the aluminium is introduced into a mixture in which the source of silicon has been predigested, i.e. a medium containing structured silicate ions. Indeed, in the synthetic procedures described in the prior art, the source of aluminium is in general dissolved in the alkaline source before the silica. If that methodology is applied, even in combination with the stoichiometric ratios described in Table 3, offretite is formed.

The sources of silicon and aluminium can be of any type. Of the sources of silicon, silicates, solid silicas, colloidal silicas and silica sols and gels can be mentioned. As source of aluminium, aluminium salts, metallic aluminium, aluminium oxides, clays and synthetic and natural zeolites can be mentioned. It is preferred to use a source of aluminium of low solubility, such as a synthetic or natural crystalline aluminosilicate. This result could confirm the hypothesis according to which the formation of MZ-34 is linked to a slow incorporation of aluminium in dissolved silicates.

Of the organic reagents, tetramethylammonium ions, introduced in the form of their hydroxide or one of their salts, are preferably used.

The duration of the synthesis can be shortened by applying methods well known in the art, such as seeding or ageing. Seeding is understood to mean the addition to the reaction mixture of 1 to 20% of zeolite MZ-34 crystals, or 1 to 30% by volume of an MZ-34 gel which has not yet begun to crystallize, or 1 to 30% of mother liquors of a previous synthesis. If the seeding takes place by means of an MZ-34 gel which has not yet begun to crystallize, it is possible to use a reaction mixture which otherwise is devoid of tetramethylammonium ions, such as described in U.S. Pat. No. 3,947,482 of GRACE. Ageing consists in maintaining the reaction mixture at a temperature below the crystallization temperature for periods between 1 hour and 20 days.

The protonated form of MZ-34 is a very efficient catalyst for a variety of processes of hydrocarbon conversion, such as cracking, isomerization, alkylation, reforming, polymerization or dewaxing. It is possible to replace a portion of the protons by cations having a catalytic effect, such as, for example, cations belonging to the class of rare earths.

The catalytic activity of MZ-34 is comparable to that of zeolite omega or zeolite ZSM-4, its main advantage being that it maintains this activity after even prolonged hydrothermal treatments.

The examples which follow illustrate the invention, without, however, limiting it.

EXAMPLE 1

This example describes a general method for synthesizing zeolite MZ-34 according to the invention.

In a beaker containing 50 ml of deionized water, 2.62 g of sodium hydroxide pellets (NaOH), 1.92 g of potassium hydroxide pellets (KOH, 85.5% pure) and 0.97 g of tetramethylammonium hydroxide pentahydrate (TMAOH, 5H$_2$O) are dissolved.

8.10 g of powdered silica (Cecagel, 80.6% of SiO$_2$, 19.4% of H$_2$O) are then added to this alkaline solution with vigorous stirring. After 10 hours and after a liquid and homogeneous mixture has been obtained, the source of aluminium is added in the form of 1.85 g of zeolite type Y (Na$_2$O; Al$_2$O$_3$; 4.6 SiO$_2$; 18.7 H$_2$O), and the mixture is stirred for five hours. The mixture then has the following overall composition:

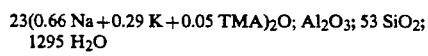
23(0.66 Na+0.29 K+0.05 TMA)$_2$O; Al$_2$O$_3$; 53 SiO$_2$; 1295 H$_2$O The mixture is transferred to a stainless steel reactor equipped with internal stirring and is heated at 115° C. for 24 hours at a rotating speed of the stirrer of 140 revolutions/minute.

The MZ-34 crystals are recovered by filtration, washed and dried in an oven at 70° C. at ambient atmosphere. Their X-ray diffraction pattern is identical to that reported in Table 1 and is characteristic of a zeolite of the mazzite type of the following structural parameters: a=1.821+0.001 nm, c=0.7608+0.004 nm and a unit cell volume of 218.27 nm$^3$.

Its composition in terms of moles of oxides, such as determined by elemental analysis, is as follows:

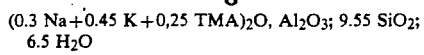
(0.3 Na+0.45 K+0,25 TMA)$_2$O, Al$_2$O$_3$; 9.55 SiO$_2$; 6.5 H$_2$O

This solid is calcined at 550° C. for 5 hours in air to decompose the TMA ions, then exchanged three times in a 1M ammonium nitrate solution under reflux (NH$_4$NO$_3$) to exchange the inorganic cations for ammonium ions. Upon completion of the treatment, the solid is analyzed. It contains 2% by weight of potassium, which indicates that 55% of the initial potassium ions are non-exchangeable.

An acid catalyst was prepared from this exchanged solid by thermal decomposition (500° C., 4 hours, 100 ml/mn of air) of the ammonium ions to give protons. The composition of the catalyst in terms of moles of oxides is as follows:

(0.75 H+0.25 K)$_2$O, Al$_2$O$_3$, 9.55 SiO$_2$, 7.2 H$_2$O

This solid adsorbs 12.6% by weight of water (1333.3 Pa 25° C.), 6.2% by weight of cyclohexane and 4.5% by weight of mesitylene (2666.6 Pa 25° C.). When applied as catalyst for the cracking of isooctane (2,2,4-trimethylpentane) at 380° C. at atmospheric pressure (1.013×10$^5$ Pa) and a space velocity (weight of hydrocarbon/weight of catalyst x time in hours) of 11 h$^{-1}$, it results in a cracking rate of 750 mmol/hxg. The catalyst was also evaluated after a hydrothermal treatment. The hydrothermal treatment consists in heating at 750° C. under a water vapour pressure of 1.013×10$^5$ Pa for 17 hours. After this treatment, it retains 75% of its crystallinity according to X-ray diffraction, its adsorption capacity for cyclohexane is 5% by weight and its activity for the cracking of isooctane is 650 mmol/hxg under the conditions described above.

EXAMPLE 2

This example illustrates the preparation of zeolite MZ-34 in the presence of a previously aged gel with a controlled supply of aluminium.

i) A gel having an overall stoichiometry of 4(0.8 Na+0.2 TMA)$_2$O, Al$_2$O$_3$, 9.2 SiO$_2$, 156 H$_2$O is prepared from 160 ml of deionized water, 10.47 g of NaOH pellets, 17.1 g of TMAOH×5H$_2$O, 35.2 g of powdered silica (non-porous silica, 91.2% of SiO$_2$, 8.8% of H$_2$O) and 9.7 g of sodium aluminate (NaAlO$_2$), using the procedure and order of addition of the reagents described in Example 1. After homogenization, the mixture is placed in a polypropylene bottle, sealed and kept in an oven at 50° C. for 23 days without stirring.

ii) A second mixture having the composition: 4 Na$_2$O; 15 SiO$_2$; 377.3 H$_2$O is prepared from 360 ml of water, 17.78 g of NaOH, 7.25 g of 85% strength KOH and 60.1 g of powdered silica (Cecagel, 80.6% of SiO$_2$, 19.4% of H$_2$O).

After digestion of the silica, 90 ml of the aged gel described in i) is added to this fresh gel. The entire mixture is transferred to a stirred autoclave of 1 liter capacity, which is raised to 115° C.

iii) After the temperature in the inside of the autoclave has reached 115° C., an alkaline aluminate solution having a concentration of 0.46 mol/l of sodium aluminate and 1.23 mol/l of potassium hydroxide prepared from 700 ml of water, 26.2 g of NaAlO$_2$ and 56.5 g of 85% strength KOH is added to the system by means of a metering pump. The output of the pump is set to such a value that a constant concentration of dissolved aluminium in the autoclave of 3 mmol/l is maintained.

Since the crystal growth, which consumes aluminium, and the growth surface increase with time, the output of the pump is regularly adjusted (between 0.6 ml/h at the beginning of the reaction and 19.2 ml/h at the end of the addition).

After 33 hours, the solid formed is recovered by filtration, washed and dried in a drying cabinet. Its X-ray diffraction pattern shows the characteristics of a zeolite of the mazzite type (Table 1) and its chemical composition is as follows:

(0.45 Na+0.30 K+0.25 TMA)$_2$O; Al$_2$O$_3$; 10.4 SiO$_2$; 13.4 H$_2$O)

After calcination to remove the TMA ions and three times of exchange under reflux with a 1M solution of NH$_4$NO$_3$, the zeolite has a residual sodium content of 1.7% by weight, which indicates that 78% of the potassium ions introduced during the course of the synthesis are non-exchangeable.

Five grams of this exchanged solid were calcined in air at 500° C., in order to obtain the protonated form, then treated in the presence of water vapour at 1 atmosphere at 750° C. for 17 hours. After the hydrothermal treatment, the solid has adsorbed 5.8% by weight of cyclohexane and 4% by weight of mesitylene. Its crystallinity, as determined from the X-ray diffraction pattern, is 78%.

EXAMPLES 3 to 6

These are examples in which the procedure of Example 1 was followed to prepare zeolite MZ-34, but where the proportion of the reagents used had been changed. (In the table in which these examples are summarized, T.C. denotes the total amount of cations and represents the sum of Na+K+TMA).

| Example | TC/Al$_2$O$_3$ | Na/TC | K/TC | TMA/TC | SiO$_2$/Al$_2$O$_3$ | H$_2$O/Al$_2$O$_3$ | OH/SiO$_2$ |
|---|---|---|---|---|---|---|---|
| 3 | 21.9 | 0.528 | 0.42 | 0.052 | 51.7 | 1261 | 0.81 |
| 4 | 11.6 | 0.562 | 0.39 | 0.05 | 29.7 | 625 | 0.77 |
| 5 | 20.2 | 0.714 | 0.233 | 0.052 | 51.3 | 1205 | 0.75 |
| 6 | 21.7 | 0.670 | 0.276 | 0.054 | 56.1 | 1247 | 0.70 |

After reaction of 24 hours at 115° C., the solids obtained in Examples 3-6 show the X-ray diffraction pattern of zeolite MZ-34 and contain 1.3 to 2.2% by weight of potassium.

The subsequent treatments of calcination+exchange, such as described above, lead to non-exchangeable potassium contents of 1 to 1.8% by weight.

EXAMPLE 7

(comparison)

This example shows that the use of the methods known in the art (addition of the source of aluminium to the alkaline solution) and the use of a soluble source of aluminium (sodium aluminate) lead to offretite and not to MZ-34.

An alkaline solution containing 50 ml of deionized water, 2.67 g of NaOH, 1.96 g of 85% KOH and 1.022 g of TMAOH×5H$_2$O is prepared, and 0.525 g of sodium aluminate are dissolved therein. After complete dissolution, 8.9 g of powdered silica (Cecagel, 80.6% of SiO$_2$, 19.4% of H$_2$O) are added with vigorous stirring. The mixture is transferred to a steel autoclave, stirred at a speed of 150 revolutions/minute and heated at 115° C. for 24 hours.

The solid fraction is recovered by filtration, washed and dried, and its X-ray diffraction pattern corresponds to that of offretite:

X-ray diffraction pattern of the zeolite obtained in

EXAMPLE 7

(comparison)

| d (10$^{-1}$ nm) | I/Io × 100 |
|---|---|
| 11.41 | 50 |
| 7.54 | 8 |
| 6.61 | 36 |
| 6.3 | 5 |
| 5.73 | 15 |
| 4.564 | 25 |
| 4.335 | 56 |
| 3.931 | 3 |
| 3.82 | 38 |
| 3.763 | 100 |
| 3.57 | 44 |
| 3.314 | 29 |
| 3.181 | 14 |
| 3.157 | 21 |
| 2.933 | 9 |
| 2.868 | 79 |
| 2.850 | 98 |
| 2.683 | 23 |
| 2.504 | 15 |
| 2.488 | 17 |
| 2.210 | 13 |
| 2.119 | 9 |
| 2.103 | 6 |
| 2.086 | 6 |

We claim:

1. Process for the synthesis of a synthetic zeolite of the mazzite type having the following x-ray diffraction pattern:

| d(10$^{-1}$ nm) | I/I$_o$ × 100 | hkl |
|---|---|---|
| 15.47 | 9 | 100 |
| 9.03 | 60 | 110 |
| 7.83 | 15 | 200 |
| 6.82 | 15 | 101 |
| 5.93 | 31 | 210 |
| 5.47 | 3 | 201 |
| 5.24 | 6 | 300 |
| 4.679 | 34 | 211 |
| 4.357 | 5 | 310 + 301 |
| 3.934 | 11 | 400 |
| 3.789 | 100 | 311 + 002 |
| 3.691 | 27 | 102 |
| 3.610 | 35 | 320 |
| 3.501 | 67 | 112 + 401 |
| 3.42 | 13 | 202 + 410 |
| 3.264 | 6 | 321 |
| 3.149 | 85 | 500 + 411 |
| 3.076 | 36 | 302 |
| 3.030 | 32 | 330 |
| 2.975 | 22 | 420 |
| 2.910 | 78 | 501 + 222 |
| 2.826 | 6 | 510 + 331 |
| 2.619 | 18 | 511 | and whose stoichiometric composition expressed as moles of oxides, corresponds to:

$$1 \pm 0.5[(1 - x)(M_{\frac{2}{n}} + zA_{\frac{2}{m}})O + xK_2O],$$

Al$_2$O$_3$, ySiO$_2$, 0-20H$_2$O where M represents at least one exchangeable n-valent element selected from the group consisting of alkali metals and alkaline earth metals, A is an organic reagent carrying m positive charges, x is the fraction of non-exchangeable potassium cations, which is in the range of 0.1 and 0.8, y is in the range of 3 and 20, and which process comprises the following steps:

preparing an alkaline solution of sodium hydroxide, potassium hydroxide and an organic reagent, adding a source of silicon with stirring, which is continued until a liquid and homogeneous mixture is obtained, letting the mixture stand, adding a source of aluminum with stirring to obtain a crystallization gel, heating the gel to the temperature of crystallization and maintaining the gel at this temperature until a crystalline phase has been formed.

2. Process according to claim 1, further comprising calcining the crystalline phase in air to form a synthetic zeolite of the mazzite type whose stoichiometric composition, expressed as moles of oxides, corresponds to:

$$1 \pm 0.5[(1-x)(M_{\frac{2}{n}} + xK_2O], Al_2O_3, ySiO_2, 0-20H_2O$$

where M represents at least one exchangeable n-valent element selected from the group consisting of alkali metals and alkaline earth metals, x is in the range of 0.1 to 0.8 and y is in the range of 3 to 20.

3. Process according to claim 2, further comprising exchanging the calcined crystalline phase with an inorganic ammonium salt and calcining the resulting product to form a synthetic zeolite of the mazzite type whose stoichiometric composition, expressed as moles of oxides, corresponds to:

$$1 \pm 0.5[(1-x)H + x K]_2O, Al_2O_3, ySiO_2, 0-20H_2O$$

4. Process according to claim 1, wherein the source of silicon is selected from the group consisting of a silicate, solid silicas, colloidal silicas and silica sols and gels.

5. The process of claim 1, wherein x is between 0.2 and 0.5.

6. The process of claim 1, wherein y is between 4 and 10.

7. The process of claim 1, wherein the molar ratios of the components of the crystalline gel are

| $SiO_2/Al_2O_3$ | 10–100 |
| $H_2O/Al_2O_3$ | 100–1000 |
| $OH^-/SiO_2$ | 0.2–1 |
| Na/T.C. | 0.4–0.9 |
| K/T.C. | 0.10–0.50 |
| TMA/T.C. | 0.02–0.2 |

T.C. = the sum of Na + K + TMA
TMA = tetramethylammonium.

8. The process of claim 1, wherein the molar ratios of the components of the crystalline gel are

| $SiO_2/Al_2O_3$ | 20–80 |
| $H_2O/Al_2O_3$ | 500–2000 |
| $OH^-/SiO_2$ | 0.5–0.9 |
| Na/T.C. | 0.4–0.9 |
| K/T.C. | 0.10–0.50 |
| TMA/T.C. | 0.02–0.2 |

T.C. = the sum of Na + K + TMA
TMA = tetramethylammonium.

9. The process of claim 1, wherein the molar ratios of the components of the crystalline gel are

| $SiO_2/Al_2O_3$ | 28–60 |
| $H_2O/Al_2O_3$ | 600–1300 |
| $OH^-/SiO_2$ | 0.65–0.85 |
| Na/T.C. | 0.4–0.9 |
| K/T.C. | 0.10–0.50 |
| TMA/T.C. | 0.05–0.15 |

T.C. = the sum of Na + K + TMA
TMA = tetramethylammonium.

10. Process according to claim 1, wherein the organic reagent is a hydroxide or a salt of a tetramethylammonium ion.

11. Process according to claim 1, wherein the source of aluminum is selected from the group consisting of aluminum salts, metallic aluminum, aluminum oxides, clays, and synthetic and natural zeolites.

12. Process according to claim 1, further comprising exchanging the calcined crystalline phase with an inorganic ammonium salt and calcining the resulting product to form a synthetic zeolite of the mazzite type whose stoichiometric composition, expressed as moles of oxides, corresponds to:

$$, 1 \pm 0.5[(1-x)H + xK]_2O, Al_2O_3, ySiO_2; 0-20 H_2O$$

where x is in the range of 0.1 to 0.8, y is in the range from 3 to 20.

13. Process according to claim 13, wherein x is in the range of 0.2 to 0.5.

14. Process according to claim 13, wherein y is in the range of 4 to 10.

15. Process according to claim 13, wherein the inorganic ammonium salt is ammonium nitrate.

16. Process according to claim 13, comprising calcining in air, at about 500°–600° C. for about 5 hours.

* * * * *